United States Patent
Hopson et al.

(10) Patent No.: US 11,261,919 B2
(45) Date of Patent: Mar. 1, 2022

(54) JOINT ASSEMBLY HAVING A PILOTING COVER FOR CENTERING A MATING FLANGE RELATIVE TO AN OUTER RACE OF A CONSTANT VELOCITY JOINT

(71) Applicant: Neapco Intellectual Property Holdings, LLC, Farmington Hills, MI (US)

(72) Inventors: Michael Hopson, Clinton Township, MI (US); Riki Patel, Royal Oak, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 309 days.

(21) Appl. No.: 16/590,596

(22) Filed: Oct. 2, 2019

(65) Prior Publication Data
US 2021/0102581 A1    Apr. 8, 2021

(51) Int. Cl.
*F16D 3/226*    (2006.01)
*F16D 1/076*    (2006.01)
*F16D 3/223*    (2011.01)

(52) U.S. Cl.
CPC .......... *F16D 3/2265* (2013.01); *F16D 1/076* (2013.01); *F16D 2003/22326* (2013.01); *Y10S 464/906* (2013.01)

(58) Field of Classification Search
CPC .................. F16D 3/2265; F16D 1/076; F16D 2003/22326; Y10S 464/906
USPC .......................................... 464/182; 403/337
See application file for complete search history.

(56) References Cited

U.S. PATENT DOCUMENTS

| | | | | |
|---|---|---|---|---|
| 3,204,429 A | * | 9/1965 | Kayser | F16D 3/22 464/906 |
| 3,869,878 A | * | 3/1975 | Davies | F16D 3/227 464/906 |
| 4,607,971 A | * | 8/1986 | Hartmann | F16D 1/033 403/337 |
| 5,207,616 A | * | 5/1993 | Moulinet | F16D 1/0841 464/905 |

(Continued)

FOREIGN PATENT DOCUMENTS

DE             636 367       * 10/1936 ..................... 403/337

OTHER PUBLICATIONS

Universal Joint and Driveshaft Design Manual, AE-7, Society of Automotive Engineers, Inc., Warrendale, PA, Section 3.2.13, TJ1079. S62. (Year: 1979).*

*Primary Examiner* — Greg Binda
(74) *Attorney, Agent, or Firm* — Dickinson Wright PLLC

(57) ABSTRACT

A joint assembly for connecting a first rotating part and a second rotating part. The joint assembly includes a constant velocity joint that has an inner race for being connected to the first rotating part and an outer race that is pivotable relative to the outer race. A mating flange couples the outer race to the second rotating part. The outer race and the mating flange each have a radially inner surface. A piloting cover is positioned axially between the outer race and the mating flange and radially supports the radially inner surface of the outer race at a first pilot point, and radially supports the radially inner surface of the mating flange at a second pilot point for centering the outer race relative to the mating flange. The first and second pilot points are located radially inwardly of a bolt circle diameter.

18 Claims, 4 Drawing Sheets

(56) References Cited

U.S. PATENT DOCUMENTS 8,449,399 B2   5/2013   Kozlowski et al.

* cited by examiner

JOINT ASSEMBLY HAVING A PILOTING COVER FOR CENTERING A MATING FLANGE RELATIVE TO AN OUTER RACE OF A CONSTANT VELOCITY JOINT

FIELD

The present disclosure relates generally to a joint assembly for coupling a first rotating part and a second rotating part. More particularly, the present disclosure relates to a joint assembly having a piloting cover for centering an outer race of a constant velocity joint relative to a mating flange.

BACKGROUND

This section of the written disclosure provides background information related to joint assemblies and is not necessarily prior art to the inventive concepts disclosed and claimed in this application. Joint assemblies for operatively coupling first and second rotating parts, such as on a driveline of an automobile, are known in the art. An example of such a joint assembly 1 is generally shown in FIG. 1. The joint assembly 1 includes a constant velocity joint 2 that has an inner race 3 that is coupled to a first rotating part 4, and an outer race 5 that is pivotable relative to the inner race 3 and coupled to a second rotating part 6 via a mating flange 7. A plurality of bolts 9 axially connect the outer race 5 and the mating flange 7. The bolts 9 are circumferentially spaced from one another and form a bolt circle diameter D1 along a circle extending through an axial center of each bolt 9. In addition to coupling the second rotating part 6 to the outer race 5, the mating flange 7 also centers the first and second rotating parts 4, 6 relative to one another by way of a protuberance 8 that surrounds and radially engages the outer race 5 radially outside of the bolt circle diameter D1.

A radial thickness of the protuberance 8 outside of the bolt circle diameter D1 provides an increased packaging requirement for the bolt joint assembly 1. This is undesirable given that there is a demand for smaller, and tighter packaging of vehicle components, especially at the underside of vehicles, in order to provide increased fuel efficiencies. Furthermore, due to a tight tolerance requirement for centering the first and second rotating parts 4, 6 to one another, the interface of the protuberance 8 and the mating flange 7 cannot be painted, which can lead to a corrosion build-up between the outer race 5 and protuberance 8, thus making it difficult to disassemble the mating flange 7 from the outer race 5 during servicing of the joint assembly 1.

In view of the foregoing, there remains a need for improvements to joint assemblies.

SUMMARY

This section provides a general summary of the inventive concepts associated with this disclosure and is not intended to be interpreted as a complete and comprehensive listing of all of its aspects, objectives, features and advantages.

According to an aspect of the disclosure, a joint assembly for connecting a first rotating part and a second rotating part is provided. The joint assembly includes a constant velocity joint that has an inner race for being connected to the first rotating part and an outer race that is pivotable relative to the inner race. A mating flange is coupled with the outer race, and is for coupling the outer race to the second rotating part. The mating flange couples the outer race to the second rotating part. The outer race and the mating flange each have a radially inner surface. A piloting cover is positioned axially between the outer race and the mating flange. The piloting cover radially supports the radially inner surface of the outer race at a first pilot point, and radially supports the radially inner surface of the mating flange at a second pilot point for centering the outer race relative to the mating flange.

According to another aspect of the disclosure, a joint assembly for coupling and transmitting torque between a first rotating shaft and a second rotating shaft of an automobile is provided. The joint assembly includes a constant velocity joint that includes an outer race that defines a compartment and extends about and along an axis between a pair of axial ends. The constant velocity joint further includes an inner race that is received in the compartment of the outer race and is pivotable relative to the outer race. A mating flange for being connected to the second rotating shaft is coupled with one of the axial ends of the outer race. The outer race and the mating flange each have a radially inner surface. A piloting cover is positioned axially between the outer race and the mating flange. The piloting cover radially supports the radially inner surface of the outer race at a first pilot point and radially supports the radially inner surface of the mating flange at a second pilot point for radially centering the outer race relative to the mating flange.

Because the piloting cover engages the radially inner surfaces of the outer race and mating flange, the first and second pilot points may be located radially internal to the bolt circle diameter, thus eliminating the need for a protuberance of the mating flange radially outside of the bolt circle diameter and providing small packaging requirements. Furthermore, because it is not necessary for a protuberance to overlie the outer race, the entire outer surface of the joint assembly may be painted with an anti-corrosion paint, thus preventing a corrosion build-up and providing easy long-term disassembly of the joint assembly.

DRAWINGS

The drawings described herein are for illustrative purposes only of selected embodiments and not all possible implementations, and are not intended to limit the scope of the present disclosure.

DETAILED DESCRIPTION

Exemplary embodiments will now be described more fully with reference to the accompanying drawings. In particular, embodiments of a joint assembly, such as for use on a driveline of an automobile, are provided so that this disclosure will be thorough and will fully convey the true and intended scope to those who are skilled in the art. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. It should also be appreciated that the present invention can be utilized in connection with other types of rotating components not described fully herein.

Figure 1:
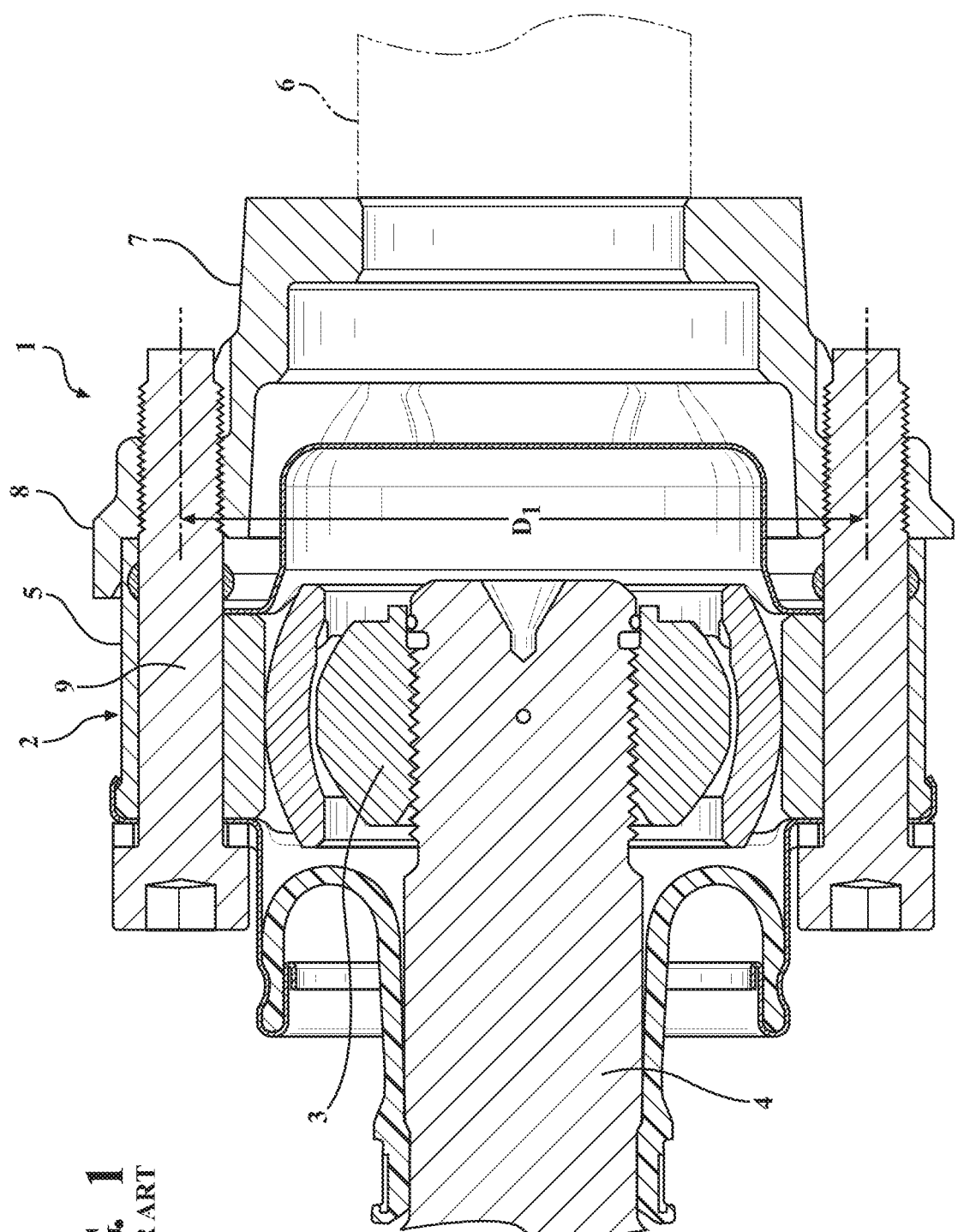
FIG. 1 is a side cross-sectional view of a prior art joint assembly.
Figure 2:
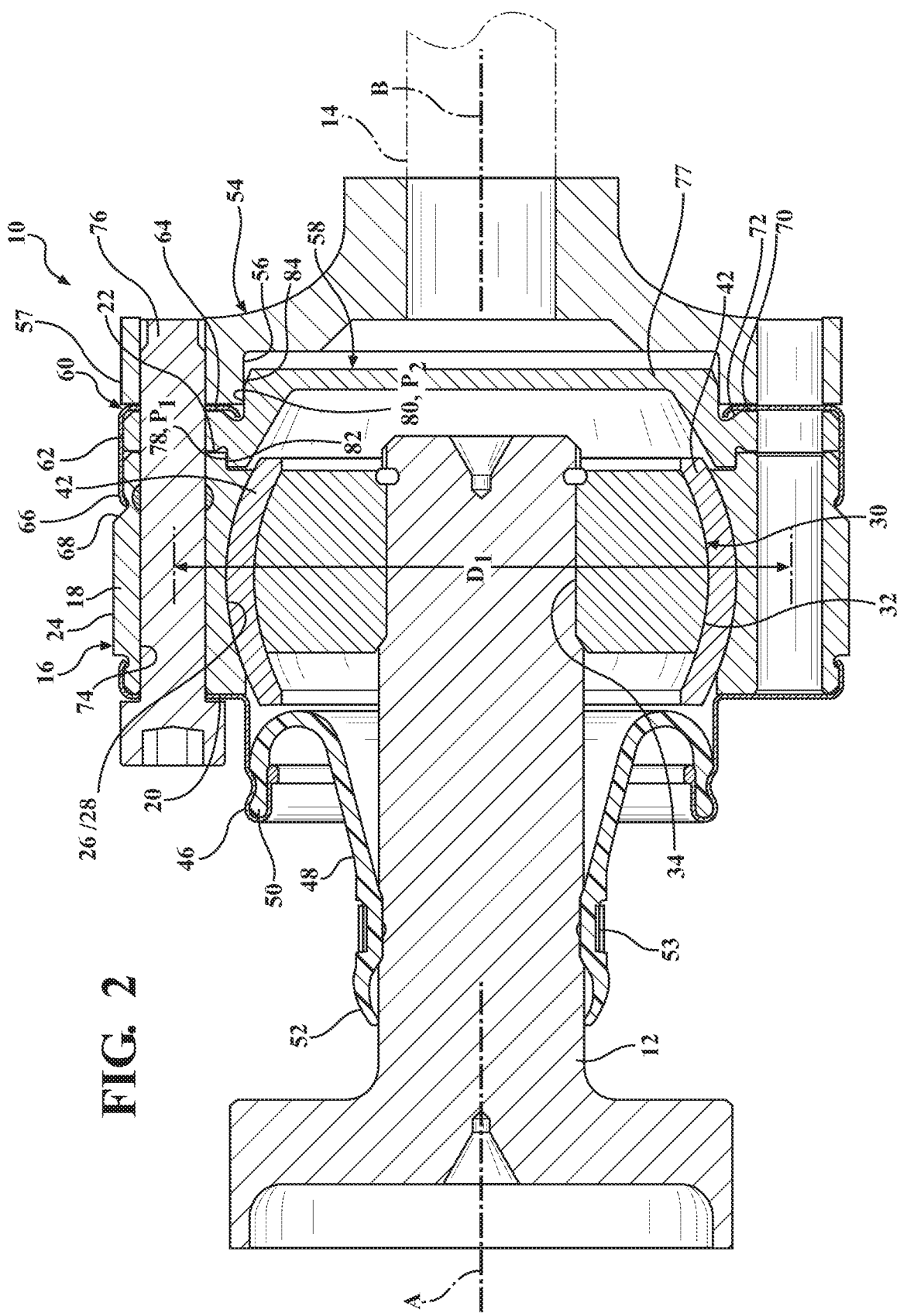
FIG. 2 is a side cross-sectional view of an example embodiment of a joint assembly in accordance with an aspect of the disclosure.
Figure 3:
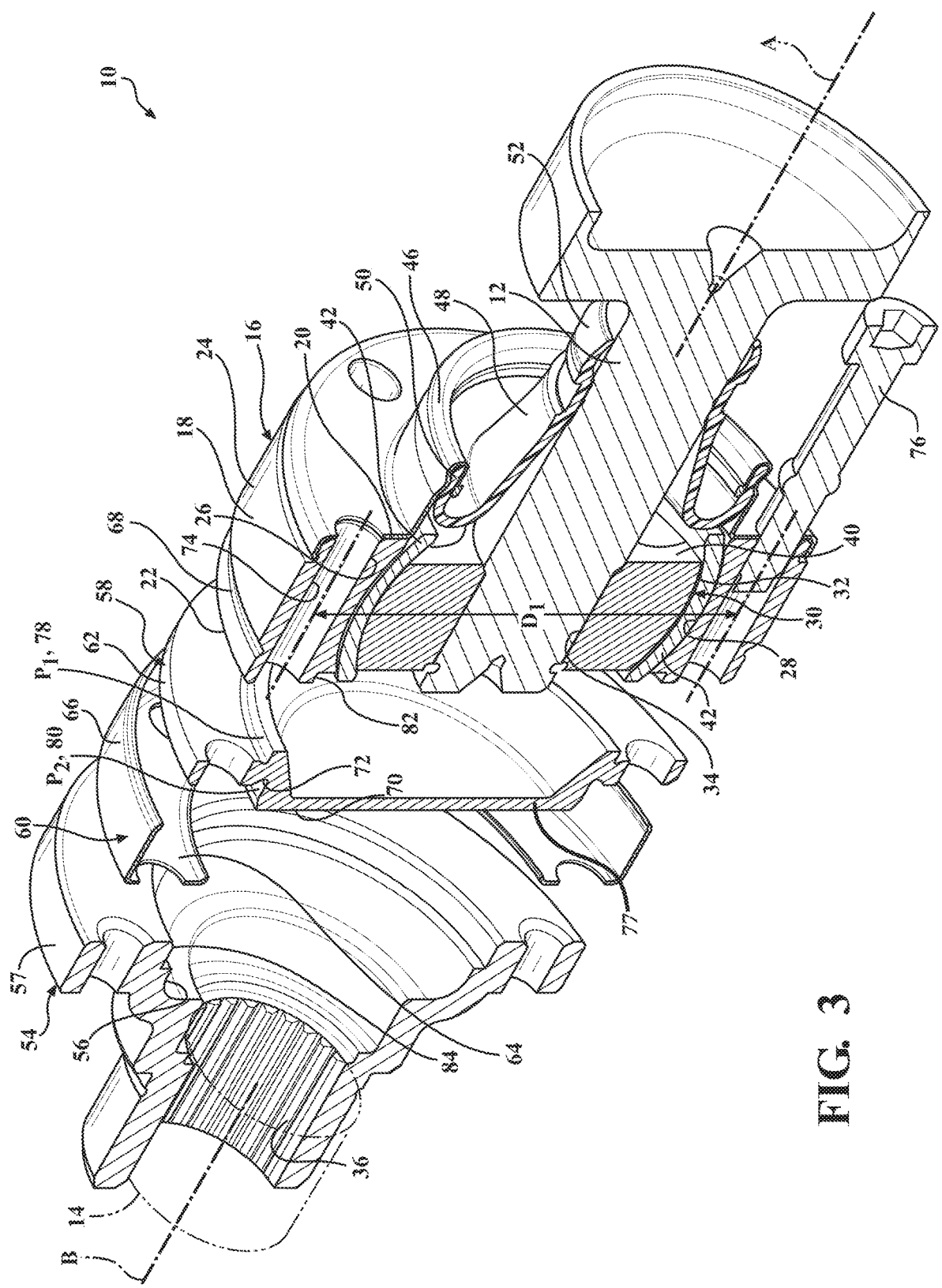
FIG. 3 is a front perspective cross-sectional view of the joint assembly of FIG. 2.
Figure 4:
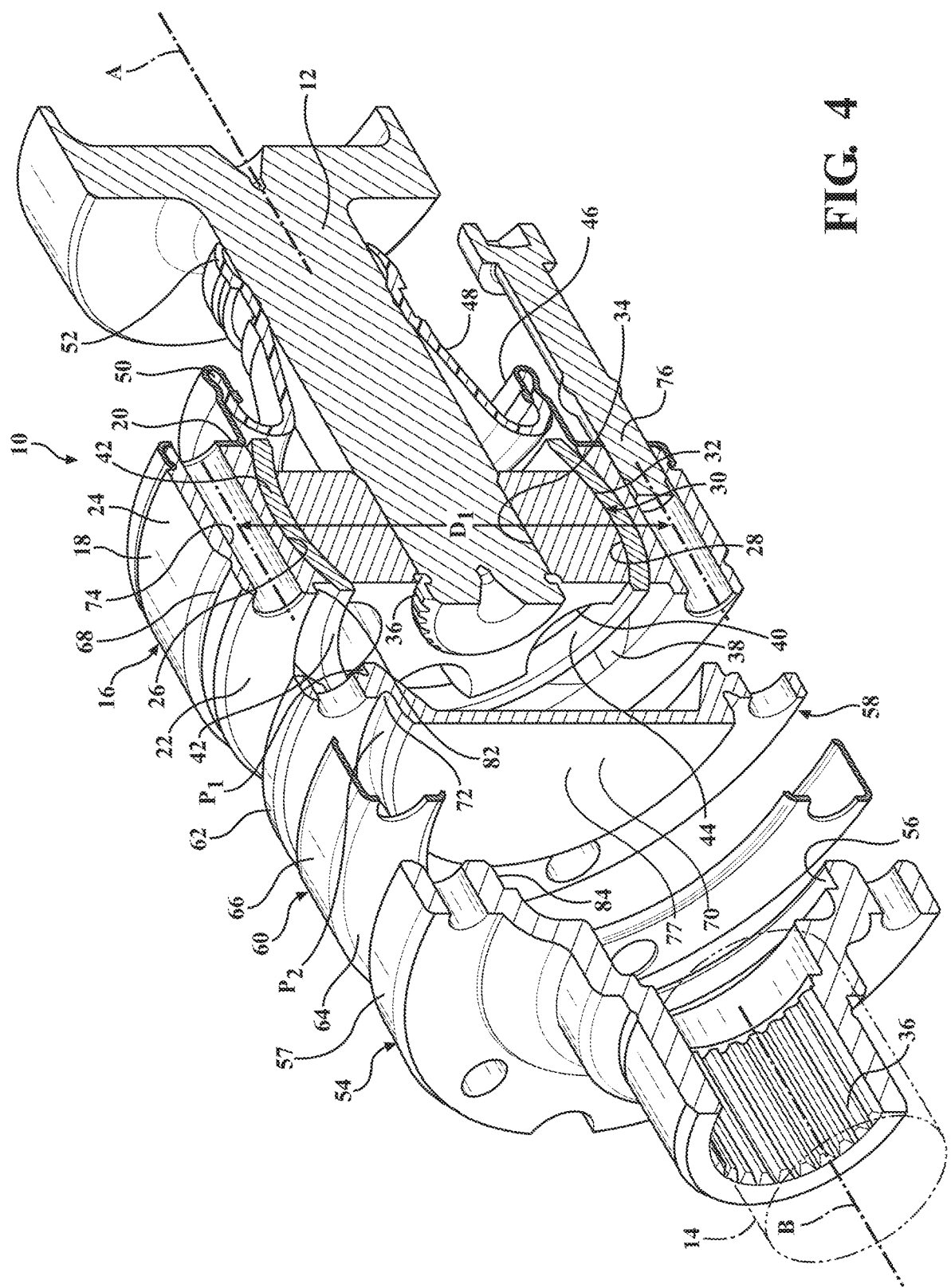
FIG. 4 is a rear perspective cross-sectional view of the joint assembly of FIG. 2.

With reference to FIGS. 2-4, wherein like numerals indicate corresponding parts throughout the several views, a joint assembly 10 is generally shown. The joint assembly 10 includes a first rotating part 12 disposed about and along a first axis A. According to the example embodiment, the first rotating part 12 is drive shaft of an automobile. A second rotating part 14 extends about and along a second axis B and is coupled with the first rotating part 12 by way of a constant velocity joint 16 and mating flange 54 (discussed in further detail below), for rotating with, and receiving drive torque from the first rotating part 12. According to the example embodiment, the second rotating part 14 is an output shaft for an automobile for extending to a transfer case, a differential, or the like. The first and second rotating parts 12, 14 could be other rotating parts.

A constant velocity joint 16 couples the first rotating part 12 to the second rotating part 14. The constant velocity joint 16 includes an outer race 18 that extends about and along the second axis B between a first axial end 20 and a second axial end 22. The outer race 18 has a radially outer surface 24 and a radially inner surface 26 that defines a compartment 28. The constant velocity joint 16 also includes an inner race 30 that extends about and along the first axis A and is disposed in the compartment 28. The inner race 30 presents a radially outward surface 32. The inner race 30 is pivotable relative to the outer race 18. The inner race 30 defines a passage 34 along the first axis A. The first shaft 12 is received by and rotationally fixed in the passage 34 of the inner race 30 by way of a plurality of splines 36 (shown in FIG. 4). The first shaft 12 is pivotable relative to the outer race 18 with the inner race 30.

As best shown in FIG. 4, the radially inner surface 26 of the outer race 18 defines a plurality of outer ball grooves 38, and the radially outward surface 32 of the inner race 30 defines a plurality of inner ball grooves 40 in circumferential alignment with the outer ball grooves 38. A plurality of balls (not shown) are positioned radially between the outer and inner races 18, 30, each in one of the inner and outer ball grooves 38, 40 for guiding the pivoting movement of the inner race 30 relative to the outer race 18 while transmitting rotational movement between the outer and inner races 18, 30. The constant velocity joint 16 further includes a cage 42 positioned in the compartment 28 radially between the outer and inner races 18, 30. The cage 42 defines a plurality of openings 44 each receiving one of the balls for circumferentially aligning the balls in predetermined circumferential locations.

A can 46 is crimped to the first axial end 20 of the outer race 18 and extends about the first rotating part 12. A boot seal 48 extends between an outer end 50 and an inner end 52. The outer end 50 is crimped within the can 46, and the inner end 52 is fixed against the first shaft 12 by a fastener 53. The boot seal 48 defines and seals a first axial boundary of the compartment 28 for containing lubricating fluids within the compartment 28.

A mating flange 54 is disposed about the second axis B and is positioned in axial alignment with the second axial end 22 of the outer race 18. The mating flange 54 has a radially inner surface 56 and a radially exterior surface 57. The second rotating component 14 is rotatably fixed to, and extends axially from the mating flange 54, e.g., with splines.

A piloting cover 58 extends about the second axis B and is positioned axially between the outer race 18 and the mating flange 54. The piloting cover closes a second axial end of the compartment 28. The piloting cover 58 radially supports the radial inner surface 26 of the outer race 18 at a first pilot point P1 and radially supports the radial interior surface 56 of the mating flange 54 at a second pilot point P2 for centering the outer race 18 relative to the mating flange 54 (and thus centering the first rotating part 12 relative to the second rotating part 14). The piloting cover 58 includes a body 77 that extends to a radially outermost surface 62. More particularly, according to the example embodiment, the piloting cover 58 defines a first ledge 78 that extends axially from the body 77 towards the outer race 18, and a second ledge 80 that extends axially from the body 77 towards the mating flange 54 in an opposite direction as the first ledge 78. The first ledge 78 radially supports the radially inner surface 26 of the outer race 18 to define the first pilot point P1, and the second ledge 80 radially supports the radially inner surface 56 of the mating flange 54 to define the second pilot point P2. According to the example embodiment, the first and second pilot points P1, P2 extend continuously about a circumference of the piloting cover 58, however it should be appreciated that the P1, P2 could occupy a smaller surface area. The outer race 18 defines a first shoulder 82 that extends radially inwardly at the second axial end 22 of the outer race 18, and the first ledge 78 of the piloting cover 58 engages the first shoulder 82 to define the first pilot point P1. The mating flange 54 defines a second shoulder 84 that extends radially therein. The second ledge 80 of the piloting cover 58 engages the second shoulder 84 to define the second pilot point P2.

A retaining cover 60 fixes the piloting cover 58 to the outer race 18. More particularly, the retaining cover 60 includes a radial portion 64 that is axially sandwiched between the piloting cover 58 and the mating flange 54, and an axial portion 66 that extends axially and overlies the radially outer surface 24 of the outer race 18 and the radially outermost surface 62 of the piloting cover 58. The radial outer surface 24 of the outer race 18 defines at least one radial crimp groove 68, and an axial face 70 of the piloting cover 58 defines at least one axial groove 72. The axial portion 66 of the retaining cover 60 is crimped into the radial crimp groove 68, and the radial portion 64 of the retaining cover 60 is received by the axial groove 72. The piloting cover 58 could alternatively be secured to the outer race 18 and/or mating flange 54 by way of alternative means, including but not limited to, a weld or adhesive.

The outer race 18, the piloting cover 58, the retaining cover 60 and the mating flange 54 together define a plurality of bolt channels 74 that each extend axially, and are arranged in circumferentially spaced relationship with one another, with each bolt channel 74 receiving a bolt 76. The bolts 76 axially secure the outer race 18, the piloting cover 58, the retaining cover 60 and the mating flange 54 to one another. The bolts 76 (and bolt channels 74) together define a bolt circle diameter D1 that extends annularly through a center of each bolt 76.

Because the first and second piloting points P1, P2 are located radially inward of the bolt circle diameter D1, the piloting cover 58 is able to adequately center the mating flange 54 relative to the outer race 18 (and also the first rotating part 12 relative to the second rotating part 14) while also reducing packaging space because there is no need for a centering protuberance of the mating flange 54 about the radial outer surface 24 of the outer race 18. This arrangement further allows the radial exterior surface 57 of the mating flange 54 to extend to a point that is approximately equal to, or radially inwardly of the radially outer surface 24 of the outer race 18.

Furthermore, because the first and second pilot points P1, P2 are located internal to the bolt circle diameter D1, it is not necessary for a protuberance of the mating flange 54 to overlie the outer race 18 to provide centering, thus the entire outer surface of the joint assembly 10 may be painted with an anti-corrosion paint to prevent a corrosion build-up and to ensure easy long-term disassembly of the joint assembly 10.

The piloting cover 58 is of a non-stamped material, and the retaining cover 60 is of a stamped material. The non-stamped material of the piloting cover 58 provides a thick, rigid cover to provide tight tolerances and precise and consistent centering. It should be appreciated that this robust arrangement allows the joint assembly 10 to be employed for use with high speed propeller shafts and drive shafts, not just half shafts or side shafts with lesser requirements.

Obviously, many modifications and variations of the present invention are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A joint assembly for connecting a first rotating part and a second rotating part, the joint assembly comprising:
   a constant velocity joint including an inner race for being connected to the first rotating part and an outer race being pivotable relative to the inner race;
   a mating flange coupled with the outer race for being coupled with the second rotating part;
   the outer race and the mating flange each having a radially inner surface;
   a piloting cover positioned axially between the outer race and the mating flange and radially supporting the radially inner surface of the outer race at a first pilot point and radially supporting the radially inner surface of the mating flange at a second pilot point for centering the outer race relative to the mating flange; and
   a retaining cover fixing the piloting cover to the outer race and including a radial portion axially sandwiched between the piloting cover and the mating flange.

2. The joint assembly as set forth in claim 1 wherein the outer race, the piloting cover, the retaining cover and the mating flange define a plurality of bolt channels each extending axially and spaced circumferentially from one another for receiving a plurality of bolts and securing the outer race, the piloting cover and the mating flange to one another; wherein the bolt channels define a bolt circle diameter; and wherein the first and second pilot points are located radially inwardly of the bolt circle diameter.

3. The joint assembly as set forth in claim 1 wherein the piloting cover is comprised of a non-stamped material, and wherein the retaining cover is comprised of a stamped material.

4. The joint assembly as set forth in claim 1 wherein the outer race defines at least one first crimp groove, and wherein the retaining cover is crimped into the first crimp groove of the outer race for retaining the cover to the outer race.

5. The joint assembly as set forth in claim 4, wherein the piloting cover defines at least one second groove, and wherein an end of the radial portion of the retaining cover is received in the second groove of the piloting cover.

6. The joint assembly as set forth in claim 1 wherein the outer race and the mating flange each have a radial outer surface, and wherein the radial outer surface of the mating flange terminates at a point that is radially equal to or radially inward of the outer race.

7. The joint assembly as set forth in claim 1 wherein the piloting cover has a body including a first ledge extending axially and a second ledge extending axially in an opposite direction as the first ledge, wherein the first ledge radially supports the radially inner surface of the outer race to define the first pilot point, and wherein the second ledge radially supports the radially inner surface of the mating flange to define the second pilot point.

8. The joint assembly as set forth in claim 7 wherein the outer race defines a first shoulder extending radially inwardly at the second end of the outer race, and wherein the first ledge of the piloting cover engages the shoulder to define the first pilot point.

9. The joint assembly as set forth in claim 7 wherein the mating flange defines a second shoulder extending radially therein, and wherein the second ledge of the piloting cover engages the shoulder to define the second pilot point.

10. The joint assembly as set forth in claim 1 wherein the piloting cover is comprised of a non-stamped material.

11. A joint assembly for coupling and transmitting torque between a first rotating shaft and a second rotating shaft of an automobile, comprising:
    a constant velocity joint including an outer race defining a compartment and extending about and along an axis between a pair of axial ends, and an inner race received in the compartment of the outer race and pivotable relative to the outer race;
    a mating flange coupled with one of the axial ends of the outer race for being connected to the second rotating shaft;
    the outer race and the mating flange each having a radially inner surface;
    a piloting cover positioned axially between the outer race and the mating flange and radially supporting the radially inner surface of the outer race at a first pilot point and radially supporting the radially inner surface of the mating flange at a second pilot point for radially centering the outer race relative to the mating flange; and
    a retaining cover fixing the piloting cover to the outer race and including a radial portion axially sandwiched between the piloting cover and the mating flange.

12. The joint assembly as set forth in claim 11 wherein the outer race, the piloting cover, the retaining cover and the mating flange define a plurality of bolt channels each extending axially and spaced circumferentially from one another for receiving a plurality of bolts for securing the outer race, the piloting cover and the mating flange to one another; wherein the bolt channels define a bolt circle diameter; and wherein the first and second pilot points are located radially inwardly of the bolt circle diameter.

13. The joint assembly as set forth in claim 11 wherein the piloting cover is comprised of a non-stamped material, and wherein the retaining cover is comprised of a stamped material.

14. The joint assembly as set forth in claim 11 wherein the outer race defines at least one first crimp groove, and wherein the retaining cover is crimped into the first crimp groove of the outer race for retaining the cover to the outer race.

15. The joint assembly as set forth in claim 14, wherein the piloting cover defines at least one second groove, and wherein an end of the radial portion of the retaining cover is received in the second groove of the piloting cover.

16. The joint assembly as set forth in claim 11 wherein the outer race and the mating flange each have a radial outer surface, and wherein the radial outer surface of the mating flange extends to a point that is radially equal to or radially inward of the outer race.

17. The joint assembly as set forth in claim 11 wherein the piloting cover includes a body defining a first ledge extending axially and a second ledge extending axially in an opposite direction as the first ledge, wherein the first ledge radially supports the radially inner surface of the outer race to define the first pilot point, and wherein the second ledge radially supports the radially inner surface of the mating flange to define the second pilot point.

18. The joint assembly as set forth in claim 17 wherein the outer race defines a first shoulder extending radially inwardly at the second end of the outer race; wherein the first ledge of the piloting cover engages the shoulder to define the first pilot point; wherein the mating flange defines a second shoulder extending radially therein; and wherein the second ledge of the piloting cover engages the shoulder to define the second pilot point.

\* \* \* \* \*